G. WOODS.
Reed Organ.

No. 9,308. Reissued July 20, 1880.

Witnesses:
Henry Chadbourn.
F. Allen.

Inventor:
George Woods.
by
Wm. Andrew
his atty.

N. PETERS, PHOTO-LITHOGRAPHER, WASHINGTON, D. C.

G. WOODS.
Reed Organ.

No. 9,308. Reissued July 20, 1880.

Witnesses:
Henry Chadbourn.
F. Allen.

Inventor:
George Woods.
by Alban Andrew
his atty

N. PETERS, PHOTO-LITHOGRAPHER, WASHINGTON, D. C.

G. WOODS.
Reed Organ.

No. 9,308. Reissued July 20, 1880.

Witnesses:
Henry Chadbourn.
F. Allen.

Inventor:
George Woods
by Albert Andrews
his atty.

N. PETERS, PHOTO-LITHOGRAPHER, WASHINGTON, D. C.

UNITED STATES PATENT OFFICE.

GEORGE WOODS, OF CAMBRIDGEPORT, MASSACHUSETTS.

REED-ORGAN.

SPECIFICATION forming part of Reissued Letters Patent No. 9,308, dated July 20, 1880.

Original No. 200,851, dated March 5, 1878. Application for reissue filed May 4, 1880.

*To all whom it may concern:*

Be it known that I, GEORGE WOODS, of Cambridgeport, in the county of Middlesex and State of Massachusetts, have invented certain new and useful Improvements in Parlor-Organs and Musical Instruments; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in parlor-organ and musical-instrument cases.

It consists, first, in improvements on the panel above the key-board, composed of a perforated fret-work panel, a little distance behind which is secured an ornamental wood or metal back, by which arrangement I obtain a neater and more durable panel as compared with the ordinary silk panels so extensively used.

My invention also consists in making the cheek-pieces and key-slip in one piece and detachable from the case, by which arrangement the action can be easily exposed for examination and repairs by simply removing the cheek-pieces and key-slip from the case.

Figure 1:
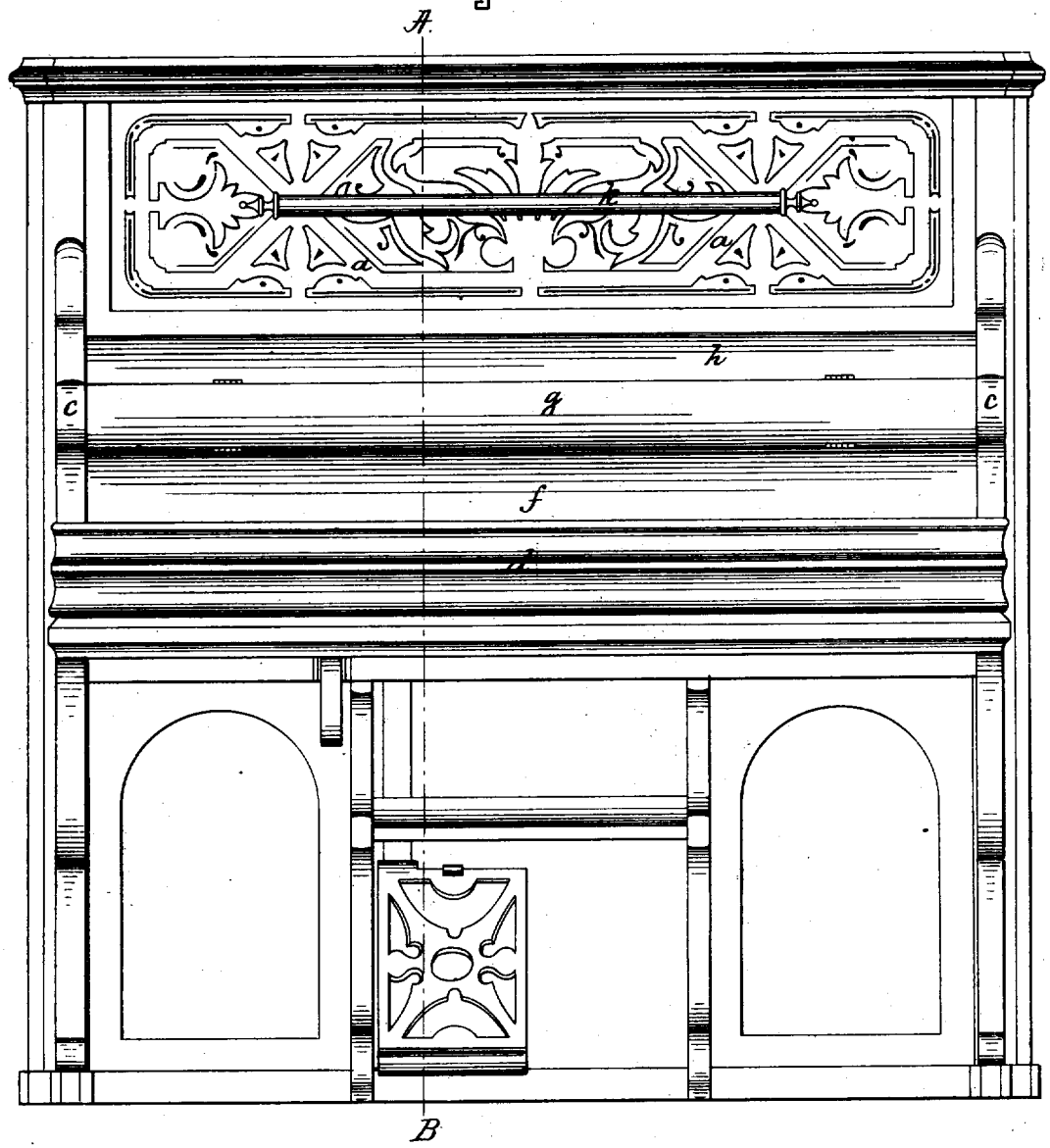
Figure 2:
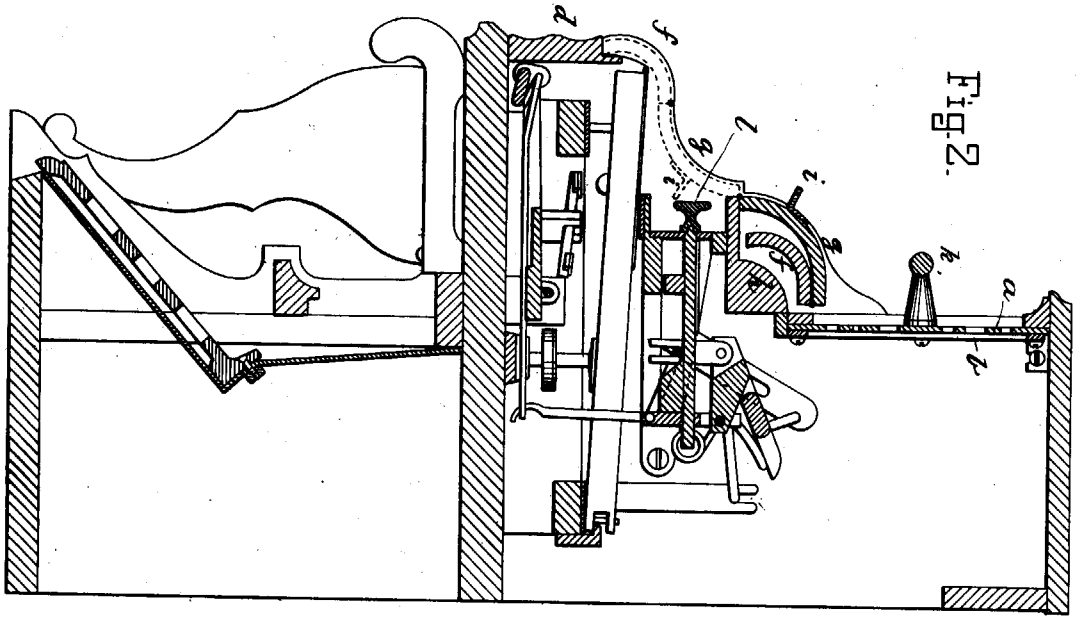
Figure 3:
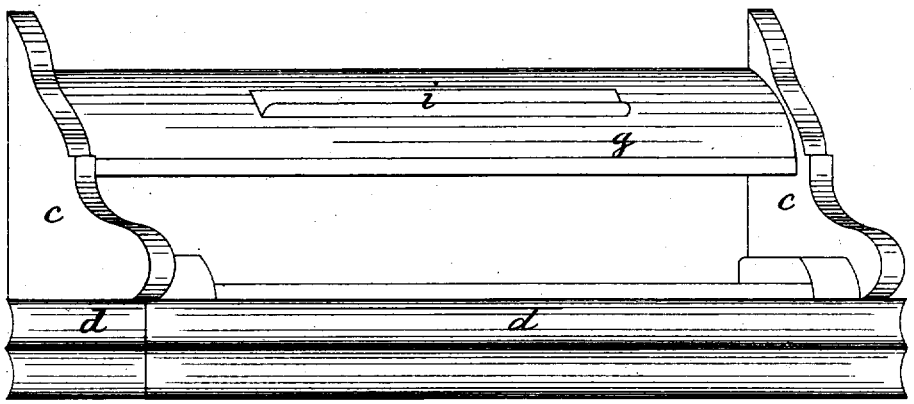

On the accompanying drawings, Figure 1 represents a front elevation of my invention. Fig. 2 represents a cross-section on the line A B, shown in Fig. 1; and Fig. 3 represents a perspective view of the cheek-pieces and key-slip.

Similar letters refer to similar parts wherever they occur on the different parts of the drawings.

*a* represents the ordinary fret-work panel above the key-board, behind which panel, but not in immediate contact with it, is secured an ornamental wood or metal plate, *b*, as shown, which combination of fret-work and ornamental back is a great improvement on the ordinary silk panels used on organs, as it can easily be kept clean and free from dust.

*c c* represent the cheek-pieces, and *d* represents the key-slip.

Formerly the said cheek-pieces were made attached to the frame *e e*, making it very inconvenient to expose the action for repairs and examination. To avoid this difficulty I make the said cheek-pieces *c c* and key-slip *d* in one piece, as fully shown in Fig. 3, the whole being detachable from the frame *e e* whenever it is necessary to expose the action for repairs or examination on a musical instrument having an upright case.

*f g* represent the fall hinged together, as shown in Fig. 2. The fall *g* is hinged to the cross-bar *h* that is attached to the cheek-pieces *c c*, and forms one piece with the same.

To the under side of the fall *g* is secured a horizontal ridge or projection, *i*, that serves as a music-rest when the fall is turned up, as shown in Fig. 2.

The upper end of the music is made to rest on the cross-bar *k* attached to the front of the perforated panel *a*, as shown in Fig. 2.

The ridge or projection *i* also serves another purpose—namely, to shut off any and all of the stops *l* that may be open at the time the fall is turned down over the keys, as is fully shown in dotted lines on Fig. 2.

What I wish to secure by Letters Patent, and claim, is—

1. The improved panel above the key-board, consisting of the perforated fret-work *a*, in combination with the ornamental wood or metal back *b*, substantially as and for the purpose set forth.

2. The cheek-pieces *c c*, made in one piece with the key-slip *d*, the whole being made detachable from the frame *e e*, substantially as and for the purpose set forth and described.

3. In combination with the fall *g*, the horizontal ridge or projection *i*, adapted to operate the stop-draws *l*, for the purpose and in a manner herein set forth and described.

4. The sectional hinged and folding fall *f g*, pivoted between the cheek-pieces *c*, and the section *g*, provided on its under side with the longitudinal projecting ridge *i*, in combination with the horizontal bar *k*, attached to the front of the organ-case, substantially as described.

GEORGE WOODS.

Witnesses:
ALBAN ANDRÉN,
HENRY CHADBOURN.